(12) United States Patent
Malgat

(10) Patent No.: US 10,729,169 B2
(45) Date of Patent: Aug. 4, 2020

(54) MULTI-SEGMENT COMPONENT FOR AN AEROSOL-GENERATING ARTICLE

(71) Applicant: Philip Morris Products S.A., Neuchatel (CH)

(72) Inventor: Alexandre Malgat, Les Tuileries de Grandson (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/757,768

(22) PCT Filed: Sep. 8, 2016

(86) PCT No.: PCT/EP2016/071234
§ 371 (c)(1),
(2) Date: Mar. 6, 2018

(87) PCT Pub. No.: WO2017/042297
PCT Pub. Date: Mar. 16, 2017

(65) Prior Publication Data
US 2019/0029315 A1 Jan. 31, 2019

(30) Foreign Application Priority Data
Sep. 11, 2015 (EP) .................................. 15184965

(51) Int. Cl.
*A24B 15/16* (2020.01)
*A24F 47/00* (2020.01)
(Continued)

(52) U.S. Cl.
CPC .............. *A24B 15/165* (2013.01); *A24D 1/02* (2013.01); *A24D 1/042* (2013.01); *A24F 47/006* (2013.01); *C09J 1/02* (2013.01); *C09J 9/00* (2013.01)

(58) Field of Classification Search
None
See application file for complete search history.

(56) References Cited

U.S. PATENT DOCUMENTS 4,967,774 A * 11/1990 White .................. A24B 15/165
131/194
5,040,552 A 8/1991 Schleich et al.
(Continued)

FOREIGN PATENT DOCUMENTS

CN 1820665 A 8/2006
CN 101048083 A 10/2007
(Continued)

OTHER PUBLICATIONS

Korean Office Action dated Jun. 22, 2018 in Patent Application No. 10-2018-7004185 (with English translation).
(Continued)

*Primary Examiner* — Phu H Nguyen
(74) *Attorney, Agent, or Firm* — Oblon, McClelland, Maier & Neustadt, L.L.P.

(57) ABSTRACT

There is provided a multi-segment component for an aerosol generating article, the multi-segment component including a combustible heat source; an aerosol-forming substrate downstream of the combustible heat source; a wrapper circumscribing the combustible heat source along at least part of a length of the combustible heat source; and an intumescent layer between the combustible heat source and the wrapper and circumscribing the combustible heat source, the intumescent layer being formed from an intumescent inorganic glue.

22 Claims, 3 Drawing Sheets

(51) Int. Cl.
*A24D 1/02* (2006.01)
*A24D 1/04* (2006.01)
*C09J 1/02* (2006.01)
*C09J 9/00* (2006.01)

(56) References Cited

U.S. PATENT DOCUMENTS

| | | |
|---|---|---|
| 5,595,577 A | 1/1997 | Bensalem et al. |
| 8,678,013 B2 | 3/2014 | Crooks et al. |
| 2007/0193593 A1 | 8/2007 | Baba et al. |
| 2011/0041861 A1 | 2/2011 | Sebastian et al. |
| 2013/0233329 A1 | 9/2013 | Sebastian et al. |
| 2014/0326260 A1 | 11/2014 | Gladden et al. |
| 2015/0289566 A1* | 10/2015 | Carraro ............... A24D 3/0287 131/281 |
| 2016/0316816 A1 | 11/2016 | Lavanchy et al. |

FOREIGN PATENT DOCUMENTS

| | | |
|---|---|---|
| CN | 102160683 A | 8/2011 |
| CN | 102481021 A | 5/2012 |
| CN | 104138032 A | 11/2014 |
| EP | 1 808 087 A1 | 7/2007 |
| EP | 2 210 509 A1 | 7/2010 |
| EP | 015651 B1 | 10/2011 |
| GB | 1 134 030 A | 11/1968 |
| GB | 2 128 873 A | 5/1984 |
| JP | 2001-171030 | 6/2001 |
| JP | 2010-19829 A | 1/2010 |
| JP | 2015-512266 A | 4/2015 |
| KR | 10-2014-0146601 A | 12/2014 |
| KR | 10-2015-0093182 A | 8/2015 |
| RU | 2 560 327 C1 | 8/2015 |
| WO | WO 2006/046422 A1 | 5/2006 |
| WO | WO 2009/022232 A2 | 2/2009 |
| WO | WO 2011/028372 A1 | 3/2011 |
| WO | 2012/164077 A1 | 12/2012 |
| WO | WO 2013/164124 A1 | 11/2013 |
| WO | WO 2014/086998 A1 | 6/2014 |
| WO | 2015/101595 | 7/2015 |
| WO | WO 2017/042298 A1 | 3/2017 |

OTHER PUBLICATIONS

Decision to Grant and Search Report dated Sep. 26, 2018 in Russian Patent Application No. 2018112715/12(019942), 18 pages (with English language translation).
Combined Chinese Office Action and Search Report dated Aug. 15, 2018 in Patent Application No. 201680048768.3, 13 pages (with English language translation).
Office Action dated Aug. 20, 2018 in Japanese Patent Application No. 2018-512914, 7 pages (with English language translation).
Decision to Grant dated Jan. 9, 2019 in Japanese Patent Application No. 2018-512914 (with English language translation).
International Search Report and Written Opinion dated Dec. 20, 2016 in PCT/EP2016/071234 filed Sep. 8, 2016.
Office Action dated Feb. 26, 2019 in Korean Patent Application No. 10-2018-7004185, 3 pages (with English translation).

* cited by examiner

MULTI-SEGMENT COMPONENT FOR AN AEROSOL-GENERATING ARTICLE

The present invention relates to a multi-segment component for an aerosol generating article. In particular, the present invention relates to a multi-segment components having a combustible heat source for heating an aerosol-forming substrate downstream of the combustible heat source, and a wrapper circumscribing at least a rear portion of the combustible heat source. The present invention also relates to combustible heat sources for such multi-segment components and to aerosol generating comprising such multi-segment components.

A number of smoking articles in which tobacco is heated rather than combusted have been proposed in the art. An aim of such 'heated' smoking articles is to reduce known harmful smoke constituents of the type produced by the combustion and pyrolytic degradation of tobacco in conventional cigarettes. In one known type of heated smoking article, an aerosol is generated by the transfer of heat from a combustible heat source to a physically separate aerosol-forming substrate, such as a tobacco-containing substrate. The aerosol-forming substrate may be located within, around or downstream of the combustible heat source. During smoking, volatile compounds are released from the aerosol-forming substrate by heat transfer from the combustible heat source and entrained in air drawn through the smoking article. As the released compounds cool, they condense to form an aerosol that is inhaled by the user.

For example, WO-A2-2009/022232 discloses a smoking article comprising a combustible heat source, an aerosol-forming substrate downstream of the combustible heat source, and a heat-conducting element around and in contact with a rear portion of the combustible heat source and an adjacent front portion of the aerosol-forming substrate. The combustible heat source and the aerosol-forming substrate are in abutting coaxial alignment and, along with the heat-conducting element, are overwrapped in an outer wrapper of cigarette paper of low air permeability to hold the various components of the smoking article together. In use, the front portion of the aerosol-forming substrate is heated primarily by conduction through the abutting rear portion of the combustible heat source and via the heat-conducting element.

Apparatus and processes for manufacturing aerosol generating articles consisting of a plurality of components are known in the art. For example, EP 2 210 509 A1 discloses a linear process for combining components of a smoking article, such as the heat source, aerosol generating substrate, expansion chamber, for the production of untipped smoking articles. The method comprises feeding a stream of components along a moving delivery path; compacting the stream of components into groups of two or more different components, wrapping the components in a web of material; and cutting the web of material in each space between groups of components to form multi-segment components including all of the components of the smoking article, except for the mouthpiece. The multi-segment components, or untipped smoking articles, are then attached to single mouthpieces by wrapping the untipped smoking article and the mouthpiece with tipping paper in a tipping machine to produce a finished smoking article.

In another example, WO-A1-2013/164124 discloses feeding a stream of first multi-segment components formed using a similar process to that described in EP 2 210 509 A1, each comprising a combustible heat source, an aerosol-forming substrate and an airflow directing segment, onto a receiving means, and feeding a stream of second multi-segment components, each comprising a mouthpiece and at least one further segment, onto the receiving means. The first multi-segment component and second multi-segment component are combined by wrapping the first multi-segment component and the second multi-segment component in a web material to form an individual smoking article having a combustible heat source at a first end and a mouthpiece at a second end.

In aerosol generating articles in which an aerosol forming substrate, for example tobacco is heated rather than combusted, the temperature attained in the aerosol-forming substrate has a significant impact on the ability to generate a sensorially acceptable aerosol. It is typically desirable to maintain the temperature of the aerosol-forming substrate within a certain range in order to optimise the aerosol delivery to a user. In some cases, the combustible heat source may become dislodged such that its position relative to the aerosol-forming substrate is altered. This may cause the temperature of the aerosol-forming substrate to drop outside of a desired range, thereby impacting the performance of the smoking article. If the temperature of the aerosol-forming substrate drops too low, for instance, it may adversely impact the consistency and the amount of aerosol delivered to a user.

It would be desirable to provide a multi-segment component for an aerosol generating article comprising a combustible heat source with improved retention.

According to the present invention, there is provided a multi-segment component for an aerosol generating article, the multi-segment component comprising: a combustible heat source; an aerosol-forming substrate downstream of the combustible heat source; and a wrapper circumscribing the combustible heat source along at least part of its length; wherein the multi-segment component further comprises an intumescent layer between the combustible heat source and the wrapper and circumscribing the combustible heat source, the intumescent layer being formed from an intumescent inorganic glue. The intumescent inorganic glue may expand when heated during combustion of the combustible heat source.

Advantageously, in examples of aspects of the invention, improved retention of the combustible heat source in the wrapper may be achieved. The retention may be improved, for example during or after combustion of the combustible heat source compared with the intumescent inorganic glue not being present. This may assist or ensure correct positioning of the combustible heat source for desirable aerosol properties. Preferably, the presence of intumescent inorganic glue acts to hold the combustible heat source in the wrapper or improves the holding of the combustible heat source in the wrapper compared with an example in which the intumescent inorganic glue is not present. As the intumescent layer is formed from an intumescent inorganic glue, there may be little or no significant loss of material or volume during combustion of the heat source. In some cases there may be no significant reduction in adhesion between the intumescent inorganic glue and the combustible heat source.

The intumescent inorganic glue may or may not form a bond with one or more of the surfaces in which it is in contact.

The presence of the intumescent layer can improve or ensure that the heat source is tightly held in the wrapper during use. Further, the intumescent layer can expand to compensate for any gap between the combustible heat source and the wrapper, for example as a result of thermal expansion of the wrapper during use. This can reduce the bypass of combustion gases around the combustible heat source.

The intumescent layer may contact the combustible heat source indirectly via one or more intermediate components. In preferred embodiments, the intumescent layer is in direct contact with the combustible heat source. With this arrangement, the intumescent layer may compensate for the surface roughness or geometry defects of the combustible heat source and may reduce the bypass of combustion gases around the combustible heat source.

The intumescent layer circumscribes the combustible heat source.

As used herein, the terms "circumscribe" and "circumscribing" are given their usual meanings to mean "extending around the entire circumference". Thus, by "circumscribing" the combustible heat source, the intumescent layer extends around the entire circumference of the combustible heat source.

This can have the advantage that the intumescent layer forms a continuous ring around the combustible heat source, and thus bypass of combustible gases around the heat source may be reduced. Consequently, the resistance-to-draw, or "RTD", of the aerosol-generating article may be maintained. Where the combustible heat source is a blind combustible heat source and the aerosol-generating article includes one or more air inlets through which air may be drawn into the aerosol-forming substrate, this arrangement ensures that substantially all of the airflow during use enters the aerosol-forming substrate through the air inlets, for desirable aerosol properties.

The intumescent inorganic glue may have any suitable expansion ratio. For example, the intumescent inorganic glue may have an expansion ratio of at least about 1.5:1, preferably from about 2:1 to about 5:1, most preferably about 3:1, when heated from 20 degrees Celsius to 700 degrees Celsius at ambient pressure.

The intumescent layer may have any suitable thickness. In certain preferred embodiments, the intumescent layer has a thickness of from at least about 0.01 mm to about 0.1 mm, preferably from about 0.01 mm to about 0.04 mm, more preferably has a minimum thickness of about 0.02 mm. Such thicknesses have been found to be particularly effective in some examples. For example, a minimum thickness of about 0.02 mm will be sufficient in many examples to compensate for combustible heat source geometry defects of up to 0.05 mm. Where the combustible heat source includes one or more recesses the thickness may be measured at a region of the heat source not including the recess. In some cases the thickness of the intumescent layer may change between the application of the layer during manufacture and for the multi-segment component or aerosol generating article. For example, the thickness of layer applied during manufacture may be chosen such that the thickness of the intumescent layer in the multi-segment component or aerosol generating article is at least about 0.01 mm, for example less than 0.1 mm.

The intumescent inorganic glue may be a foaming intumescent inorganic glue.

The intumescent inorganic glue may have any suitable composition. In certain preferred embodiments, the intumescent inorganic glue of the multi-segment component or of the aerosol generating article comprises at least 1% by weight of water, preferably between about 1% and about 7% by weight of water, more preferably from about 1% to about 5% by weight of water. Vaporisation of the water in the intumescent inorganic glue on heating during combustion of the combustible heat source may cause bubbles to form, thus expanding or foaming the intumescent inorganic glue. It will be understood that such intumescent inorganic glues may have a higher water content when supplied for manufacture of the multi-segment component, and when applied during manufacture of the multi-segment component or of the aerosol generating article. The water content of the intumescent inorganic glue may reduce when the intumescent inorganic glue dries out following application during manufacture. For example, the intumescent inorganic glue may comprise 60% by weight of water when initially supplied but may subsequently comprise 30% by weight of water or less after the intumescent inorganic glue has been deposited and dried or partially dried.

Preferably the intumescent layer is formed from a sodium silicate glue.

In certain embodiments, the intumescent layer is formed from a sodium silicate glue having a molar ratio of from about 2 to about 3.5 parts $SiO_2$ to 1 part $Na_2O$.

The intumescent inorganic glue may be applied directly onto an outer surface of the combustible heat source. In such examples, the outer surface of the combustible heat source may be substantially continuous. In certain preferred embodiments, the combustible heat source has at least one shaped recess on its outer surface, and wherein the intumescent inorganic glue of the intumescent layer at least partially fills the shaped recess.

With this arrangement, the retention of the combustible heat source within the wrapper may be further improved. This may help to ensure correct positioning of the combustible heat source and, thus, desirable aerosol properties.

In certain embodiments, the at least one shaped recess comprises at least one longitudinal groove. This arrangement may be particularly effective since the groove is aligned parallel to the direction along which undesirable movement of the combustible heat source may occur and thus increases the retention force applied by the intumescent inorganic glue to the combustible heat source in the longitudinal direction.

In certain embodiments, the at least one longitudinal groove comprises a plurality of circumferentially spaced apart longitudinal grooves.

In certain embodiments, the depth of the at least one shaped recess is less than about 10 percent of the outer diameter of the combustible heat source. This has the advantage that the mass of the heat source, and consequently its heating performance, is substantially unaffected by the presence of the recess. Additionally, the time required for the intumescent inorganic glue to dry after its application may be reduced, improving manufacturability.

In some examples, the depth of the at least one shaped recess is between about 0.05 mm and about 0.8 mm, for example between about 0.2 mm and 0.4 mm.

In certain embodiments, the depth of the at least one shaped recess decreases towards its downstream end. This has the advantage that the retention of the heat source can be further improved as the intumescent inorganic glue may act as a wedge to resist upstream movement of the heat source relative to the wrapper. It has also been found to result in improved filling of the at least one recess by the intumescent inorganic glue, since the intumescent inorganic glue more easily flows along the length of the recess during manufacture.

In such examples, the depth of the at least one shaped recess may decrease gradually along a transition portion, or in a stepwise manner.

In certain embodiments, the combustible heat source comprises a rear portion having a substantially constant cross-section, the at least one recess terminating at the upstream end of the rear portion. With this arrangement, the at least one recess does not extend into the rear portion and, consequently, the rear portion forms a barrier to reduce the bypass of combustion gases around the heat source in the downstream direction. The rear portion may define the maximum outer diameter of the combustible heat source. Such an arrangement may improve ease of manufacture by making it easier to wrap the wrapper around the heat source. It may also improve conductive heat transfer from the heat source to the wrapper. This may be particularly advantageous in examples of multi-segment component in which the wrapper comprises a heat-conducting layer for transferring thermal energy from the combustible heat source to the aerosol-forming substrate.

The rear portion of the combustible heat source may have any suitable dimensions. In certain preferred embodiments, the rear portion has a length of less than about 3 mm, preferably of from about 2 mm to about 3 mm.

In certain preferred embodiments, the radially outer edges of the at least one shaped recess are curved with a radius of curvature of at least about 0.05 mm. This may advantageously result in improved filling of the recess by the glue. It may also result in a reduction in the visibility of the at least one recess through the wrapper and reduce the risk of damage to the wrapper caused by the radially outer edges of the at least one recess during wrapping. Furthermore, with this arrangement, the radially outer edges of the combustible heat source are less likely to be damaged or break off during manufacture, reducing the amount of dust, such as carbon dust, generated during manufacture. Preferably, the radius of curvature is from about 0.05 mm to about 0.5 mm, more preferably from about 0.2 mm to about 0.4 mm.

In some examples, the number of shaped recesses may be from 8 to 17, preferably from 12 to 16. In some examples of the invention, the shaped recesses are substantially evenly spaced around the periphery of the combustible heat source.

The outer diameter of the combustible heat source may vary along its length. In certain embodiments, the outer diameter of the combustible heat source is substantially constant along substantially the entire length of the combustible heat source. This may result in improved manufacturability.

The multi-segment component comprises a wrapper circumscribing the combustible heat source along at least part of its length. The wrapper may be formed from one or more elements. For example, the wrapper may be formed from a single sheet of material.

In some embodiments, the wrapper comprises one or more layers of heat-conductive material. Preferably, the one or more layers of heat-conductive material are positioned around at least a rear portion of the combustible heat source and at least a front portion of the aerosol-forming substrate. In such embodiments, the heat-conductive material provides a thermal link between the combustible heat source and the aerosol-forming substrate and advantageously helps to facilitate adequate heat transfer from the combustible heat source to the aerosol-forming substrate to provide an acceptable aerosol. The heat-conductive material may be in direct contact with one or both of the combustible heat source and the aerosol-forming substrate. Alternatively or in addition, the layer of heat-conductive material may be spaced apart from one or both of the combustible heat source and the aerosol-forming substrate, such that there is no direct contact between the heat-conductive material and one or both of the combustible heat source and the aerosol-forming substrate.

The one or more layers of heat-conductive material are preferably non-combustible. In certain embodiments, the one or more layers of heat-conductive material may be oxygen restricting. In other words, the one or more layers of heat-conductive material may inhibit or resist the passage of oxygen through the wrapper.

Suitable heat-conductive materials for use in multi-segment components according to the invention include, but are not limited to: metal foil wrappers such as, for example, aluminium foil wrappers, steel wrappers, iron foil wrappers and copper foil wrappers; and metal alloy foil wrappers.

In some embodiments, the wrapper comprises one or more layers of heat-insulative material. With this arrangement, the heat-insulative material reduces the heat transfer from the combustible heat source to an outer surface of the wrapper, reducing the temperature of the surface of aerosol generating article. Preferably, the heat-insulative material is non-combustible. Inclusion of a non-combustible, heat insulating layer advantageously helps to reduce the ignition propensity of aerosol generating articles comprising multi-segment components according to the invention by reducing the temperature of the surface of the aerosol generating article.

The wrapper may be a laminate wrapper formed from a plurality of layers.

The wrapper may comprise a radially outer layer of heat-conductive material and a radially inner layer of heat-insulative material. In some embodiments, the wrapper comprises a radially inner layer of heat-conductive material and a radially outer layer of heat-insulative material. Other arrangements are possible. In preferred arrangements, the wrapper may advantageously conduct heat from the combustible heat source to the aerosol-forming substrate, while controlling radiative heat loss from the combustible heat source and the combustible heat source.

As used herein, the term "intumescent layer" denotes a layer which expands upon exposure to elevated temperatures, other than only as a result of its coefficient of thermal expansion.

As used herein, the term "inorganic glue" refers to an adhesive, or combination of adhesives, which is substantially free of carbon.

As used herein, the term "expansion ratio" refers to the ratio of the thickness of the intumescent layer before expansion to the thickness of the intumescent layer after expansion.

As used herein, the phrase "intumescent layer has a thickness of" refers to the dimension of the layer in the radial direction.

As used herein, the term "longitudinal" is used to describe the direction between the proximal end and the opposed distal end of the smoking article.

As used herein, the terms "radial" and "transverse" are used to describe the direction perpendicular to the direction between the proximal end and the opposed distal end of the smoking article.

As used herein, the term "length" is used to describe the maximum dimension in the longitudinal direction of the smoking article. That is, the maximum dimension in the direction between the proximal end and the opposed distal end of the smoking article in the direction between the proximal end and the opposed distal end of the smoking article.

As used herein, the term "thickness" refers to the maximum dimension of the intumescent layer in the radial direction.

As used herein, the term "groove" refers to an elongate depression in the surface of the heat source.

As used herein, the term "shaped recess" refers to a recess with predetermined dimensions which is deliberately formed in the outer surface of the combustible heat source.

As used herein, the term "diameter" denotes the maximum transverse dimension of elongate combustible heat sources according to the invention.

As used herein, the phrase "the depth of the at least one recess decreases towards its downstream end" means that the depth of each recess at a first location along its length is greater than the depth of each recess at a second location downstream of the first location. This includes embodiments in which the depth of each recess is greatest at or proximal to its upstream end, as well as embodiments in which the depth of each recess is greatest at a point between its upstream and downstream ends As used herein, the phrase "the outer diameter of the combustible heat source is substantially constant" means that the outer envelope of the heat source, that is, the smallest space within which the heat source can be accommodated, remains substantially the same along the length of the heat source.

As used herein, the term "heat-insulative material" is used to describe material having a bulk thermal conductivity of less than about 50 milliwatts per metre Kelvin (mW/(m K)) at 23° C. and a relative humidity of 50% as measured using the modified transient plane source (MTPS) method.

As used herein, the term "heat-conductive material" is used to describe a having a bulk thermal conductivity of at least about 10 W per metre Kelvin (W/(m K)) at 23° C. and a relative humidity of 50% as measured using the modified transient plane source (MTPS) method.

As used herein, the term "aerosol-forming substrate" is used to describe a substrate capable of releasing upon heating volatile compounds, which can form an aerosol.

The aerosols generated from aerosol-forming substrates of multi-segment components according to the invention may be visible or invisible and may include vapours (for example, fine particles of substances, which are in a gaseous state, that are ordinarily liquid or solid at room temperature) as well as gases and liquid droplets of condensed vapours.

As used herein, the term "non-combustible" is used to describe a material that is substantially non-combustible at temperatures reached by the combustible heat source during combustion and ignition thereof.

As used herein, the term "ignition propensity" refers to the tendency of aerosol generating articles, such as smoking articles, to cause a substrate on which they lie to burn. The ignition propensity should be low enough to eliminate, reduce or almost eliminate the likelihood of an aerosol generating article causing a substrate on which it is placed to burn. The ignition propensity may be measured according to ISO 12863:2010(E).

The combustible heat source is preferably a solid heat source, and may comprise any suitable combustible fuel including, but not limited to, carbon and carbon-based materials containing aluminium, magnesium, one or more carbides, one or more nitrides and combinations thereof. Solid combustible heat sources for heated smoking articles and methods for producing such heat sources are known in the art and described in, for example, U.S. Pat. Nos. 5,040,552 and 5,595,577. Typically, known solid combustible heat sources for heated smoking articles are carbon-based, that is they comprise carbon as a primary combustible material.

The combustible heat source is preferably a blind combustible heat source. As used herein, the term "blind" describes a heat source that does not comprise any air flow channels extending from the front end face to the rear end face of the combustible heat source. As used herein, the term "blind" is also used to describe a combustible heat source including one or more airflow channels extending from the front end face of the combustible heat source to the rear end face of the combustible heat source, wherein a combustible substantially air impermeable barrier between the rear end face of the combustible heat source and the aerosol-forming substrate barrier prevents air from being drawn along the length of the combustible heat source through the one or more airflow channels.

Multi-segment components according to the invention comprising blind combustible heat sources comprise one or more air inlets downstream of the rear end face of the combustible heat source for drawing air into the one or more airflow pathways. Multi-segment components according to the invention comprising non-blind combustible heat sources may also comprise one or more air inlets downstream of the rear end face of the combustible heat source for drawing air into the one or more airflow pathways.

In certain preferred embodiments, multi-segment components according to the invention comprising blind combustible heat sources comprise one or more air inlets located proximate to the downstream end of the aerosol-forming substrate.

In use, air drawn along the one or more airflow pathways of aerosol generating articles including multi-segment components according to the invention comprising a blind combustible heat source for inhalation by a user does not pass through any airflow channels along the blind combustible heat source. The lack of any airflow channels through the blind combustible heat source advantageously substantially prevents or inhibits activation of combustion of the blind combustible heat source during puffing by a user. This substantially prevents or inhibits spikes in the temperature of the aerosol-forming substrate during puffing by a user.

By preventing or inhibiting activation of combustion of the blind combustible heat source, and so preventing or inhibiting excess temperature increases in the aerosol-forming substrate, combustion or pyrolysis of the aerosol-forming substrate under intense puffing regimes may be advantageously avoided. In addition, the impact of a user's puffing regime on the composition of the mainstream aerosol may be advantageously minimised or reduced.

The inclusion of a blind combustible heat source may also advantageously substantially prevent or inhibit combustion and decomposition products and other materials formed during ignition and combustion of the blind combustible heat source from entering air drawn through multi-segment components according to the invention during use thereof. This is particularly advantageous where the blind combustible heat source comprises one or more additives to aid ignition or combustion of the blind combustible heat source.

In multi-segment components according to the invention comprising a blind combustible heat source, heat transfer from the blind combustible heat source to the aerosol-forming substrate occurs primarily by conduction and heating of the aerosol-forming substrate by forced convection is minimised or reduced. This may advantageously help to minimise or reduce the impact of a user's puffing regime on the composition of the mainstream aerosol of smoking articles according to the invention.

In multi-segment components according to the invention comprising a blind combustible heat source, it is particularly important to optimise the conductive heat transfer between the combustible heat source and the aerosol-forming substrate. As described further below, the inclusion of one or more heat-conducting elements around at least a rear portion of the combustible carbonaceous heat source and at least a front portion of the aerosol-forming substrate is particularly preferred in multi-segment components according to the invention including blind heat sources, where there is little if any heating of the aerosol-forming substrate by forced convection.

It will be appreciated that multi-segment components according to the invention may comprise blind combustible heat sources comprising one or more closed or blocked passageways through which air may not be drawn for inhalation by a user.

For example, multi-segment components according to the invention may comprise blind combustible heat sources comprising one or more closed passageways that extend from the front end face at the upstream end of the blind combustible carbonaceous heat source only part way along the length of the blind combustible carbonaceous heat source.

The inclusion of one or more closed air passageways increases the surface area of the blind combustible heat source that is exposed to oxygen from the air and may advantageously facilitate ignition and sustained combustion of the blind combustible heat source.

In certain embodiments of the invention, the combustible heat source comprises at least one longitudinal airflow channel, which provides one or more airflow pathways through the heat source. The term "airflow channel" is used herein to describe a channel extending along the length of the heat source through which air may be drawn through the smoking article for inhalation by a user. Such heat sources including one or more longitudinal airflow channels are referred to herein as "non-blind" heat sources.

The diameter of the at least one longitudinal airflow channel may be between about 1.5 mm and about 3 mm, more preferably between about 2 mm and about 2.5 mm. The inner surface of the at least one longitudinal airflow channel may be partially or entirely coated, as described in more detail in WO-A-2009/022232.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds, which are released from the substrate upon heating. Alternatively, the aerosol-forming substrate may comprise a non-tobacco material. The aerosol-forming substrate may further comprise one or more aerosol formers. Examples of suitable aerosol formers include, but are not limited to, glycerine and propylene glycol.

In some embodiments, the aerosol-forming substrate is a rod comprising a tobacco-containing material.

If the aerosol-forming substrate is a solid aerosol-forming substrate, the solid aerosol-forming substrate may comprise, for example, one or more of: powder, granules, pellets, shreds, spaghetti strands, strips or sheets containing one or more of: herb leaf, tobacco leaf, fragments of tobacco ribs, reconstituted tobacco, homogenised tobacco, extruded tobacco and expanded tobacco. The solid aerosol-forming substrate may be in loose form, or may be provided in a suitable container or cartridge. For example, the aerosol-forming material of the solid aerosol-forming substrate may be contained within a paper or other wrapper and have the form of a plug. Where an aerosol-forming substrate is in the form of a plug, the entire plug including any wrapper may be considered to be the aerosol-forming substrate.

Optionally, the solid aerosol-forming substrate may contain additional tobacco or non-tobacco volatile flavour compounds, to be released upon heating of the solid aerosol-forming substrate. The solid aerosol-forming substrate may also contain capsules that, for example, include the additional tobacco or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, spaghetti strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

The aerosol-forming substrate may be in the form of a plug or segment comprising a material capable of emitting volatile compounds in response to heating circumscribed by a paper or other wrapper. As stated above, where an aerosol-forming substrate is in the form of such a plug or segment, the entire plug or segment including any wrapper is considered to be the aerosol-forming substrate.

The aerosol-forming substrate preferably has a length of between about 5 mm and about 20 mm. In certain embodiments, the aerosol-forming substrate may have a length of between about 6 mm and about 15 mm or a length of between about 7 mm and about 12 mm.

In preferred embodiments, the aerosol-forming substrate comprises a plug of tobacco-based material wrapped in a plug wrap. In particularly preferred embodiments, the aerosol-forming substrate comprises a plug of homogenised tobacco-based material wrapped in a plug wrap.

In any of the above embodiments, the combustible heat source and the aerosol-forming substrate may be in abutting coaxial alignment. Advantageously, the intumescent layer can retain the combustible heat source in direct contact with the aerosol-forming substrate during use to ensure a good thermal connection between the two components and to maintain the temperature of the aerosol-forming substrate within a desired range.

As used herein, the terms "abutting" and "abut" are used to describe a component, or a portion of a component, being in direct contact with another component, or portion of a component.

Multi-segment components according to the invention may comprise a heat-conducting element around and in direct contact with both at least a rear portion of the combustible heat source and at least a front portion of the aerosol-forming substrate. In such embodiments, the heat-conducting element provides a thermal link between the combustible heat source and the aerosol-forming substrate of smoking articles according to the invention and advantageously helps to facilitate adequate heat transfer from the combustible heat source to the aerosol-forming substrate to provide an acceptable aerosol.

Alternatively or in addition, multi-segment components according to the invention may comprise a heat-conducting element spaced apart from one or both of the combustible heat source and the aerosol-forming substrate, such that there is no direct contact between the heat-conducting element and one or both of the combustible heat source and the aerosol-forming substrate.

Where the multi-segment component comprises a heat-conducting element around at least a rear portion of the combustible heat source and at least a front portion of the aerosol-forming substrate, the heat-conducting element may be formed by the wrapper. For example, the wrapper may comprise one or more layers of heat conductive material which form the one or more heat-conducting elements.

The one or more heat-conducting elements are preferably non-combustible. In certain embodiments, the one or more heat-conducting elements may be oxygen restricting. In other words, the one or more heat-conducting elements may inhibit or resist the passage of oxygen through the heat-conducting element.

Suitable heat-conducting elements for use in multi-segment components according to the invention include, but are not limited to: metal foil wrappers such as, for example, aluminium foil wrappers, steel wrappers, iron foil wrappers and copper foil wrappers; and metal alloy foil wrappers.

Multi-segment components according to the invention may further comprise a cap configured to at least partially cover the front end face of the combustible heat source, wherein the cap is removable to expose the front end face of the combustible heat source prior to use of the smoking article.

As used herein, the term "cap" refers to a protective cover that substantially surrounds the distal end of the multi-segment component, including the front end face. Providing a cap that is removed prior to ignition of the combustible heat source advantageously protects the combustible heat source prior to use.

For example, multi-segment components according to the invention may comprise a removable cap attached at a line of weakness to the distal end of the smoking article, wherein the cap comprises a cylindrical plug of material circumscribed by a wrapper as described in WO-A1-2014/086998.

Multi-segment components according to the present invention may further comprise a transfer element, or spacer element, downstream of the aerosol-forming substrate. Such an element may take the form of a hollow tube that is located downstream of an aerosol-forming substrate.

The transfer element may abut the aerosol-forming substrate. Alternatively, the transfer element may be spaced apart from the aerosol-forming substrate. The transfer element may be coaxial alignment with one or both of the combustible heat source and the aerosol-forming substrate.

The inclusion of a transfer element advantageously allows cooling of the aerosol generated by heat transfer from the combustible heat source to the aerosol forming substrate. The inclusion of a transfer element also advantageously allows the overall length of an aerosol generating article comprising a multi-segment component according to the invention to be adjusted to a desired value, for example to a length similar to that of a conventional cigarette, through an appropriate choice of the length of the transfer element.

The transfer element may have a length of between about 7 mm and about 50 mm, for example a length of between about 10 mm and about 45 mm or of between about 15 mm and about 30 mm. The transfer element may have other lengths depending upon the desired overall length of the aerosol generating article, and the presence and length of other components within the multi-segment component or an aerosol generating article comprising the multi-segment component.

Preferably, the transfer element comprises at least one open-ended tubular hollow body. In such embodiments, in use, air drawn into the aerosol generating article passes through the at least one open-ended tubular hollow body as it passes downstream through the aerosol generating article.

The transfer element may comprise at least one open-ended tubular hollow body formed from one or more suitable materials that are substantially thermally stable at the temperature of the aerosol generated by the transfer of heat from the combustible heat source to the aerosol-forming substrate. Suitable materials are known in the art and include, but are not limited to, paper, cardboard, plastics, such a cellulose acetate, ceramics and combinations thereof.

Alternatively or in addition, multi-segment components according to the invention may comprise an aerosol-cooling element or heat exchanger downstream of the aerosol-forming substrate. The aerosol-cooling element may comprise a plurality of longitudinally extending channels.

The aerosol-cooling element may comprise a gathered sheet of material selected from the group consisting of metallic foil, polymeric material, and substantially non-porous paper or cardboard. In certain embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

In certain preferred embodiments, the aerosol-cooling element may comprise a gathered sheet of biodegradable polymeric material, such as polylactic acid (PLA) or a grade of Mater-Bi® (a commercially available family of starch based copolyesters).

Multi-segment components according to the invention comprise a wrapper that circumscribes the combustible heat source along at least a part of its length. Preferably, the wrapper circumscribes at least a front portion of the aerosol-forming substrate and at least a rear portion of the combustible heat source. In preferred embodiments, the wrapper circumscribes the aerosol-forming substrate, at least a rear portion of the combustible heat source and any other components of the smoking article downstream of the aerosol-forming substrate.

The wrapper may be formed from any suitable material or combination of materials. Suitable materials are well known in the art and include, but are not limited to, cigarette paper.

According to a second aspect of the invention, there is provided an aerosol-generating article comprising a multi-segment component according to any of the embodiments described above.

The aerosol-generating article may be a smoking article.

The combustible heat source is located at or proximate to the distal end of the aerosol-generating article. The mouth end of the aerosol-generating article is downstream of the distal end of the aerosol-generating article. The proximal end of the aerosol-generating article may also be referred to as the downstream end of the aerosol-generating article and the distal end of the aerosol-generating article may also be referred to as the upstream end of the aerosol-generating article. Components, or portions of components, of the aerosol-generating article and of the multi-segment component may be described as being upstream or downstream of one another based on their relative positions between the proximal end of the aerosol-generating article and the distal end of the aerosol-generating article. The mouth end is downstream of the distal end.

As used herein, the terms 'upstream' and 'front', and 'downstream' and 'rear', are used to describe the relative positions of components, or portions of components of the multi-segment component in relation to the direction in which a user draws on an aerosol-generating article incorporating the multi-segment component during use thereof. Aerosol-generating articles according to the invention comprise a proximal end through which, in use, an aerosol exits the aerosol-generating article for delivery to a user. The proximal end of the aerosol-generating article may also be referred to as the mouth end. In use, a user draws on the mouth end of the aerosol-generating article in order to inhale an aerosol generated by the aerosol-generating article.

Aerosol generating articles according to the invention preferably comprise a mouthpiece located at the proximal end thereof.

Preferably, the mouthpiece is of low filtration efficiency, more preferably of very low filtration efficiency. The mouthpiece may be a single segment or component mouthpiece. Alternatively, the mouthpiece may be a multi-segment or multi-component mouthpiece.

The mouthpiece may comprise a filter comprising one or more segments comprising suitable known filtration materials. Suitable filtration materials are known in the art and include, but are not limited to, cellulose acetate and paper. Alternatively or in addition, the mouthpiece may comprise one or more segments comprising absorbents, adsorbents, flavourants, and other aerosol modifiers and additives or combinations thereof.

Aerosol generating articles according to the invention may comprise a multi-segment component according to any of the embodiments described above and a mouthpiece segment at a downstream end of the multi-segment component.

Alternatively, aerosol generating articles according to the invention may comprise a first multi-segment component according to any of the embodiments described above and a second multi-segment component downstream of the first multi-segment component, the second multi-segment component comprising a mouthpiece located at the proximal end thereof. The second multi-segment component may comprise an aerosol-cooling element upstream of the mouthpiece. The second multi-segment component may comprise a transfer element, or spacer element, upstream of the mouthpiece. In certain embodiments, the second multi-segment component comprises an aerosol-cooling element and a transfer element, or spacer element, upstream of the mouthpiece.

In one particular embodiment, the aerosol generating article comprises a first multi-segment component having a combustible heat source, an aerosol-forming substrate downstream of the combustible heat source and a transfer element, or spacer element, downstream of the aerosol-forming substrate, and a second multi-segment component at a downstream end of the first multi-segment component, the second multi-segment component comprising an aerosol-cooling element, a transfer or spacer element downstream of the aerosol-cooling element, and a mouthpiece at a proximal end thereof.

Aerosol generating articles according to the present invention may be substantially cylindrical in shape. The aerosol generating article may be substantially elongate. The aerosol generating article has a length and a circumference substantially perpendicular to the length.

The aerosol-forming substrate may be substantially cylindrical in shape. The aerosol-forming substrate may be substantially elongate. The aerosol-forming substrate also has a length and a circumference substantially perpendicular to the length. The aerosol-forming substrate may be located in the aerosol generating article such that the length of the aerosol-forming substrate is substantially parallel to the airflow direction in the aerosol generating article.

The transfer section or element may be substantially elongate.

Aerosol generating articles according to the invention may have any desired length. For example, aerosol generating articles according to the invention may have a total length of between approximately 65 mm and approximately 100 mm.

Aerosol generating articles according to the invention may have any desired external diameter. For example, aerosol generating articles according to the invention may have an external diameter of between approximately 5 mm and approximately 12 mm.

Aerosol generating articles according to the invention may be assembled using known methods and machinery.

In a third aspect of the invention, there is provided a method of manufacturing a multi-segment component for an aerosol generating article, comprising the steps of: providing a combustible heat source; providing an aerosol-forming substrate downstream of the combustible heat source; applying an intumescent inorganic glue to a web of wrapper material; and wrapping the web of wrapper material around the combustible heat source to form a wrapper circumscribing the combustible heat source along at least part of its length, the intumescent inorganic glue forming an intumescent layer between the combustible heat source and the wrapper.

The step of applying the intumescent inorganic glue may be carried out in any suitable manner. For example, the intumescent inorganic glue may be applied by one or more of spreading, spraying, using a glue gun, or rotogravure or other printing techniques.

The intumescent layer may have any suitable thickness. In certain preferred embodiments, the intumescent inorganic glue is applied to the web of wrapper material and the web wrapped around the combustible heat source such that the intumescent layer has a thickness of from at least about 0.01 mm to about 0.1 mm, preferably from about 0.01 mm to about 0.04 mm, more preferably a minimum thickness of about 0.02 mm.

The intumescent inorganic glue may be a foaming intumescent inorganic glue. The intumescent inorganic glue may have any suitable composition. In certain preferred embodiments, the intumescent inorganic glue may comprise from about 40% to about 75% by weight of water when applied to the web of wrapper material, preferably from about 50% to about 65% by weight of water when applied to the web of wrapper material. The water content of the intumescent inorganic glue may reduce after it has been applied to the web of wrapper material. In certain preferred embodiments, once the multi-segment component has been manufactured and the intumescent inorganic glue has been dried or partially dried, the intumescent inorganic glue comprises at least 1% by weight of water, preferably between about 1% and about 7% by weight of water, more preferably from about 1% to about 5% by weight of water.

In yet a further aspect of the invention, there is provided a method of manufacturing an aerosol generating article comprising the steps of providing a multi-segment component manufactured according to any of the methods described above, and providing a mouthpiece downstream of the multi-segment component. Preferably, the mouthpiece is of low filtration efficiency, more preferably of very low filtration efficiency. The mouthpiece may be a single segment or component mouthpiece. Alternatively, the mouthpiece may be a multi-segment or multi-component mouthpiece. The mouthpiece may comprise a filter comprising one or more segments comprising suitable known filtration materials. Suitable filtration materials are known in the art and include, but are not limited to, cellulose acetate and paper. Alternatively or in addition, the mouthpiece may comprise one or more segments comprising absorbents, adsorbents, flavourants, and other aerosol modifiers and additives or combinations thereof.

The mouthpiece may be at the downstream end of the multi-segment component. Alternatively, the step of providing a mouthpiece may be carried out by providing a second multi-segment component downstream of the first multi-segment component, the second multi-segment component comprising a mouthpiece located at the proximal end thereof. The second multi-segment component may comprise an aerosol-cooling element upstream of the mouthpiece. The second multi-segment component may comprise a transfer element, or spacer element, upstream of the mouthpiece. In certain embodiments, the second multi-segment component comprises an aerosol-cooling element and a transfer element, or spacer element, upstream of the mouthpiece. In one particular embodiment, the aerosol generating article comprises a first multi-segment component having a combustible heat source, an aerosol-forming substrate downstream of the combustible heat source and a transfer element, or spacer element, downstream of the aerosol-forming substrate, and a second multi-segment component at a downstream end of the first multi-segment component, the second multi-segment component comprising an aerosol-cooling element, a transfer or spacer element downstream of the aerosol-cooling element, and a mouthpiece at a proximal end thereof.

All scientific and technical terms used herein have meanings commonly used in the art unless otherwise specified. The definitions provided herein are to facilitate understanding of certain terms used frequently herein.

Features described in relation to one or more aspects may equally be applied to other aspects of the invention. In particular, features described in relation to the multi-segment component of the first aspect may be equally applied to the aerosol generating article of the second aspect, and vice versa. Additionally, features described in relation to the multi-segment component of the first aspect or the aerosol generating article of the second aspect may be equally applied to the method of manufacture of the third aspect.

The invention will be further described, by way of example only, with reference to the accompanying drawings in which.

Figure 1:
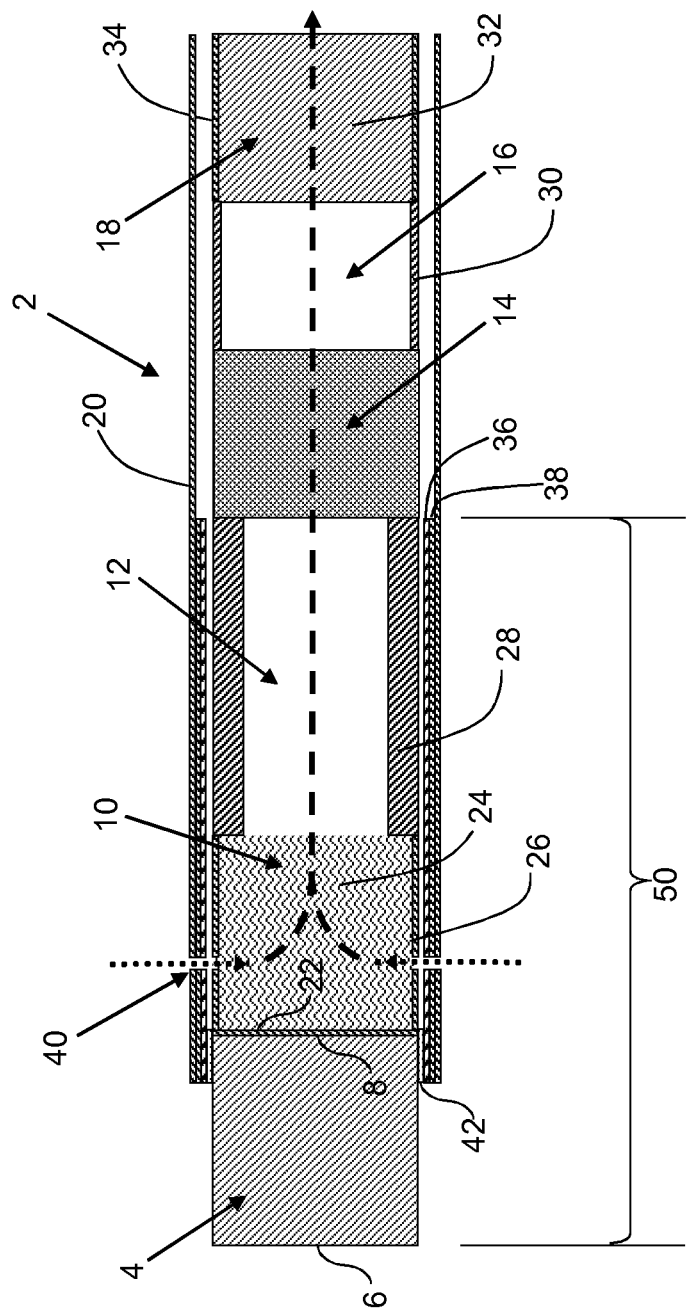
FIG. 1 shows a schematic longitudinal cross-sectional view of a smoking article having a multi-segment component according to a first embodiment of the invention.

The smoking article 2 according to the first embodiment of the invention shown in FIG. 1 comprises a blind combustible heat source 4 having a front face 6 and an opposed rear face 8, an aerosol-forming substrate 10, a transfer element 12, an aerosol-cooling element 14, a spacer element 16 and a mouthpiece 18 in abutting coaxial alignment.

The blind combustible heat source 4 is a blind carbonaceous combustible heat source and is located at the distal end of the smoking article 2. As shown in FIG. 1, a non-combustible substantially air impermeable barrier 22 in the form of a disc of aluminium foil is provided between the rear face 8 of the blind combustible heat source 4 and the aerosol-forming substrate 10. The barrier 22 is applied to the rear face 8 of the blind combustible heat source 4 by pressing the disc of aluminium foil onto the rear face 8 of the blind combustible heat source 4 and abuts the rear face 8 of the combustible carbonaceous heat source 4 and the aerosol-forming substrate 10.

In other embodiments of the invention (not shown), the non-combustible substantially air impermeable barrier 22 between the rear face 8 of the blind combustible heat source 4 and the aerosol-forming substrate 10 may be omitted.

The aerosol-forming substrate 10 is located immediately downstream of the barrier 22 applied to the rear face 8 of the blind combustible heat source 4. The aerosol-forming substrate 10 comprises a cylindrical plug of homogenised tobacco-based material 24 including an aerosol former such as, for example, glycerine, wrapped in plug wrap 26.

The transfer element 12 is located immediately downstream of the aerosol-forming substrate 10 and comprises a cylindrical open-ended hollow cellulose acetate tube 28.

The aerosol-cooling element 14 is located immediately downstream of the transfer element 12 and comprises a gathered sheet of biodegradable polymeric material such as, for example, polylactic acid.

The spacer element 16 is located immediately downstream of the aerosol-cooling element 14 and comprises a cylindrical open-ended hollow paper or cardboard tube 30.

The mouthpiece 18 is located immediately downstream of the spacer element 16. As shown in FIG. 1, the mouthpiece 18 is located at the proximal end of the smoking article 2 and comprises a cylindrical plug of suitable filtration material 32 such as, for example, cellulose acetate tow of very low filtration efficiency, wrapped in filter plug wrap 34.

As shown in FIG. 1, the smoking article 2 further comprises a single heat-conducting element 36 of suitable material such as, for example, aluminium foil, overlying a rear portion of the blind combustible heat source 4, the entire length of the aerosol-forming substrate 10 and the entire length of the transfer element 12.

In other embodiments of the invention (not shown), the transfer element 12 may extend beyond the single heat-conducting element 36 in the downstream direction. That is the single heat-conducting element 36 may overlie only a front portion of the transfer element 12. In other embodiments of the invention (not shown), the single heat-conducting element 36 may not overlie any of the transfer element 12.

In further embodiments of the invention (not shown), the aerosol-forming substrate 10 may extend beyond the single heat-conducting element 36 in the downstream direction. That is the single-heat-conducting element 36 may overlie only a front portion of the aerosol-forming substrate 10.

The single heat-conducting element 36 is circumscribed by a wrapper 38 of heat-insulative sheet material such as, for example, cigarette paper, of low air permeability, which is wrapped around the aerosol-forming substrate 10, transfer element 12 and a rear portion of the blind combustible heat source 4 to form a multi-segment component 50 of the smoking article 2.

The aerosol-cooling element 14, spacer element 16 and mouthpiece 18 may be circumscribed by a further wrapper (not shown) to form a second multi-segment component (also not shown) downstream of the multi-segment component 50. In such examples, the multi-segment component 50 and the second multi-segment component may be held together by the outer wrapper 20 or by an additional wrapper or band of tipping paper. Alternatively, the aerosol-cooling element 14, spacer element 16 and mouthpiece 18 may be individual segments that are held together and connected to the multi-segment component 50 by the outer wrapper 20.

In other embodiments (not shown) the wrapper 38 may extend downstream of the transfer element 12 to circumscribe other components of the smoking article 2, such as the aerosol-cooling element and the spacer element 16 which are then incorporated into the multi-segment component. The mouthpiece 18 may then be connected at the downstream end of the multi-segment component by outer wrapper 20, or by an additional wrapper or a band of tipping paper (not shown).

In the smoking article 2 according to the first embodiment of the invention shown in FIG. 1, the single heat-conducting element 36 and the wrapper 38 extend to approximately the same position on the blind combustible heat source 4 in the upstream direction and in the downstream direction, such that the upstream ends of the single heat-conducting element 36 and the wrapper 38 are substantially aligned over the blind combustible heat source 4 and such that the downstream ends of the single heat-conducting element 36 and the wrapper 38 are substantially aligned at the downstream end of the transfer element 12.

However, it will be appreciated that in other embodiments of the invention (not shown), the wrapper 38 may extend beyond the single heat-conducting element 36 in the upstream direction.

The smoking article 2 according to the first embodiment of the invention comprises one or more first air inlets 38 around the periphery of the aerosol-forming substrate 10.

As shown in FIG. 1, a circumferential arrangement of first air inlets 40 is provided in the plug wrap 26 of the aerosol-forming substrate 10, the wrapper 38 and the single heat-conducting element 36 to admit cool air (shown by dotted arrows in FIG. 1) into the aerosol-forming substrate 10.

Also shown in FIG. 1 is an intumescent layer 42 positioned between the combustible heat source 4 and the wrapper 38. In this example, the intumescent layer 42 is arranged on an inner surface of the heat-conducting element 36 such that it is in direct contact with the combustible heat source 4. In other examples (not shown), the intumescent layer 42 may be in contact with the combustible heat source 4 indirectly, for example via the heat-conducting element 36. The intumescent layer 42 circumscribes the combustible heat source 4 and is arranged to expand in response to heat from the combustible heat source 4. The intumescent layer 42 is formed from an intumescent inorganic glue. Suitable intumescent inorganic glues include sodium silicate glues, such as those available from PQ Corporation of Malvern, Pa., US.

As described below in relation to FIGS. 2A and 2B, the combustible heat source may comprise one or more shaped recesses on its outer surface which are filled or partially filled by the intumescent inorganic glue of the intumescent layer 42 to improve retention of the combustible heat source 4 within the wrapper 38.

The smoking article may further comprise a band of tipping paper (not shown) circumscribing a downstream end portion of the outer wrapper 20.

The multi-segment component 50 may further comprise a removable cap (not shown) at its distal end and directly adjacent to the heat source 4. For example, the removable cap may comprise a central portion including a desiccant, such as glycerine, to absorb moisture as compared to the heat source, which is wrapped in a portion of one or both of the outer wrapper 20 and the wrapper 38 and connected to the rest of that wrapper along a line of weakness comprising a plurality of perforations in the wrapper that circumscribe the smoking article 2. In such examples, to use the smoking article, the user removes the removable cap by transversely compressing the cap by pinching it between thumb and finger. By compressing the cap, sufficient force is provided to the line of weakness to locally break the wrapper by which the cap is connected. The user then removes the cap by twisting the cap to break the remaining portion of the line of weakness. When the cap is removed the heat source is partially exposed which enables the user to light the smoking article.

In use, a user ignites the blind combustible heat source 4 of the smoking article 2 according to the first embodiment of the invention and then draws on the mouthpiece 18. When a user draws on the mouthpiece 18, air (shown by dotted arrows in FIG. 1) is drawn into the aerosol-forming substrate 10 of the smoking article 2 through the air inlets 40.

The front portion of the aerosol-forming substrate 10 is heated by conduction through the rear face 8 of the blind combustible heat source 4 and the barrier 22.

The heating of the aerosol-forming substrate 10 by conduction releases glycerine and other volatile and semi-volatile compounds from the plug of homogenised tobacco-based material 24. The compounds released from the aerosol-forming substrate 10 form an aerosol that is entrained in the air drawn into the aerosol-forming substrate 10 of the smoking article 2 through the first air inlets 40 as it flows through the aerosol-forming substrate 10. The drawn air and entrained aerosol (shown by dashed arrows in FIGS. 1 and 2) pass downstream through the transfer element 12, aerosol-cooling element 14 and spacer element 16, where they cool and condense. The cooled drawn air and entrained aerosol pass downstream through the mouthpiece 18 and are delivered to the user through the proximal end of the smoking article 2 according to the first embodiment of the invention. The non-combustible substantially air impermeable barrier 22 on the rear face 8 of the blind combustible heat source 4 isolates the blind combustible heat source 4 from air drawn through the smoking article 2 such that, in use, air drawn through the smoking article 2 does not come into direct contact with the blind combustible heat source 4.

In use, the single heat-conducting element 36 retains heat within the smoking article 2 to help maintain the temperature of the aerosol-forming substrate 10 and so facilitate continued and enhanced aerosol delivery. In addition, the single heat-conducting element 36 transfers heat along the aerosol-forming substrate 10 so that heat is dispersed through a larger volume of the aerosol-forming substrate 10. This helps to provide a more consistent puff-by-puff aerosol delivery.

During heating of the intumescent layer 42 by the combustible heat source 4, water in the intumescent inorganic glue is vapourised to produce air bubbles, thus expanding or foaming the glue. As the intumescent layer 42 is formed from an intumescent inorganic glue, there is substantially no loss of material or volume from the intumescent layer 42 during combustion of the combustible heat source 4. The expanded intumescent layer 42 ensures that the combustible heat source 4 remains tightly held in the wrapper 38 during use, even if one or both of the heat-conducting element 36 and the wrapper 38 expand due to their own thermal expansion characteristics. In addition to ensuring that the combustible heat source 4 remains tightly held within the wrapper 38, the expanded intumescent layer 42 also forms a barrier around the combustible heat source 4 to reduce or prevent bypass of combustion gases around the outside of the combustible heat source 4. In this example, the intumescent layer 42 is in direct contact with the outer surface of the combustible heat source 4. Consequently, the expanded intumescent layer 42 can compensate for the surface roughness of the combustible heat source, or for geometry defects of the combustible heat source 4, to reduce the bypass of combustion gases around the heat source 4. Consequently, the RTD of the smoking article 2 may be maintained. Additionally, since the combustible heat source 4 is a blind combustible heat source, the expanded intumescent layer 42 ensures that substantially all of the airflow during use enters the aerosol-forming substrate 10 through the air inlets 40, for desirable aerosol properties.

The intumescent layer 42 has an unexpanded thickness of from about 0.01 mm to about 0.1 mm and has an expansion ratio of from about 1.5:1 to about 5:1. Consequently, the intumescent layer 42 can be expanded without substantially affecting the external appearance of the smoking article 2.

Figure 2A:
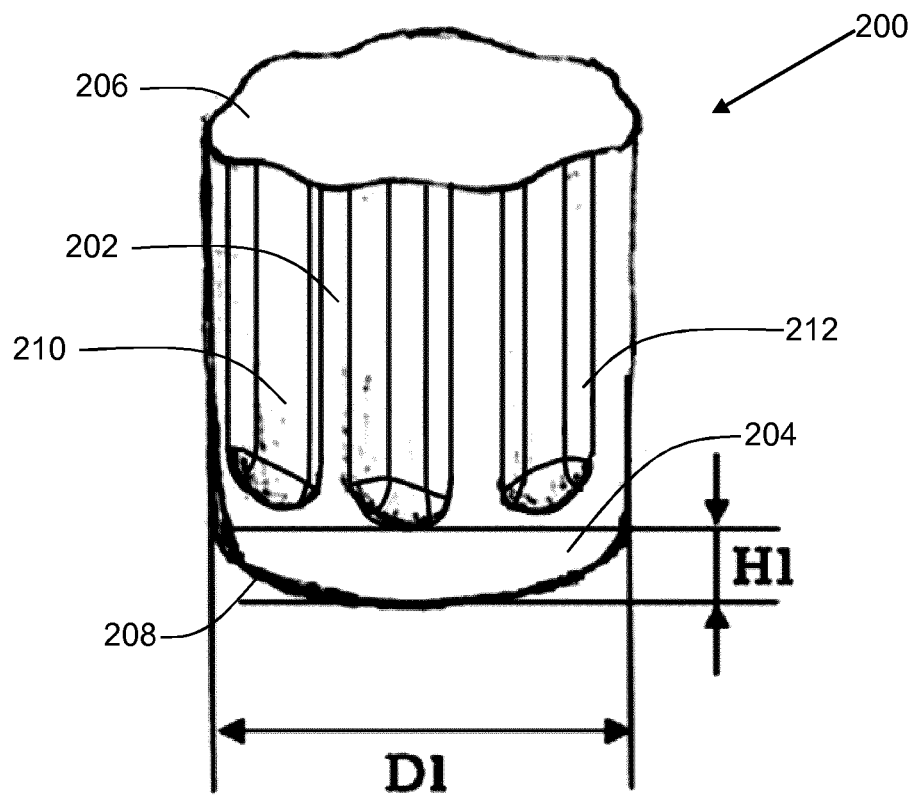
FIG. 2A shows a schematic perspective view of a combustible heat source for the multi-segment component of FIG. 1.
Figure 2B:
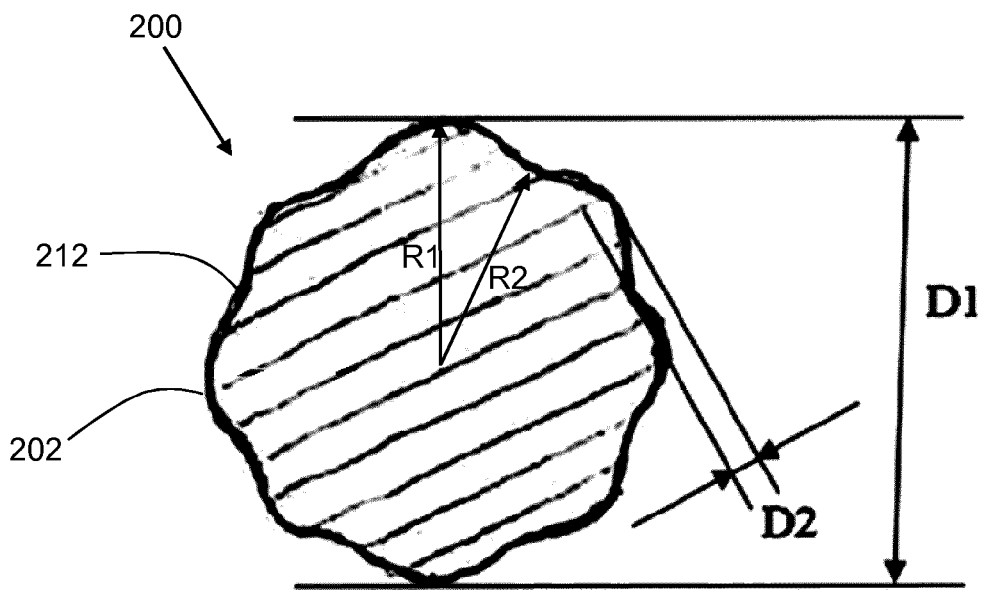
FIG. 2B shows a schematic transverse cross-sectional view of the combustible heat source of FIG. 2A.

FIGS. 2A and 2B show a combustible heat source 200 for a multi-segment component according to the present invention. The combustible heat source 200 is substantially cylindrical and has an outer diameter, as indicated by dimension D1 in FIGS. 2A and 2B, that is substantially constant along the entire length of the combustible heat source 200. The combustible heat source 200 has a front face 206 and an opposed rear face 208 and a plurality of shaped recesses on its outer surface 202 formed from a plurality of circumferentially spaced apart longitudinal grooves 210. The longitudinal grooves 210 extend from the front face 206 towards the rear face 208 but terminate upstream of the rear face 208 to define a rear portion 204 having a substantially constant, circular cross-section and a substantially continuous outer surface. The longitudinal grooves 210 terminate at the upstream end of the rear portion 204. The rear portion 204 extends from the downstream end of the longitudinal grooves 210 to the rear face 208 of the combustible heat source 200 and has a length as indicated by dimension H1. In this example, the length of the rear portion is less than about 3 mm.

Since the grooves 210 do not extend to the rear face 208 of the combustible heat source 200, during use, the rear portion 204 may form a barrier to reduce the bypass of combustion gases around heat source in the downstream direction. The rear portion may define the maximum outer diameter of the combustible heat source. Such an arrangement may improve ease of manufacture by making it easier to wrap the wrapper around the heat source. It may also improve conductive heat transfer from the heat source to the wrapper. This may be particularly advantageous in examples of multi-segment component in which the wrapper comprises a heat-conducting layer for transferring thermal energy from the combustible heat source to the aerosol-forming substrate During manufacture of a multi-segment component incorporating the combustible heat source 200, the longitudinal grooves 210 may be filled or partially filled with a glue to improve retention of the combustible heat source 200 within a wrapper of the multi-segment component. As the grooves 210 are aligned with the longitudinal axis of the combustible heat source 200, when the heat source 200 is assembled in an aerosol generating article, such as smoking article 2 discussed above in relation to FIG. 1, the longitudinal grooves 210 will be parallel to the upstream direction of the aerosol generating article and thus parallel to the direction in which undesirable movement of the combustible heat source 200 may occur. With this arrangement, the retention force applied by the glue to the combustible heat source 200 is increased by the orientation of the longitudinal grooves 210. This may help to ensure correct positioning of the combustible heat source within the aerosol generating article during use and, thus, desirable aerosol properties.

In this example, the longitudinal grooves 210 are evenly spaced around the circumference of the combustible heat source 200 and are substantially the same length. In other examples (not shown) the longitudinal grooves 210 may be unevenly spaced and one or more of the longitudinal grooves 210 may be shorter or longer than the other longitudinal grooves 210.

The longitudinal grooves 210 each have a bottom, or trough, 212 which is connected to the outer surface 202 of the combustible heat source 200 by radially outer edges 214 of the groove 210. The outer edges 214 are curved with a radius of curvature of at least about 15% of the depth D2 of its respective groove. Preferably the radius of curvature is at least about 0.05 mm. This may advantageously result in improved filling of the grooves 210 during manufacture of a multi-segment component. It may also result in a reduction in the visibility of the at least one recess through a wrapper of the multi-segment component and reduce the risk of damage to the wrapper caused by the radially outer edges of the at least one recess during wrapping. Furthermore, with this arrangement, the radially outer edges of the combustible heat source are less likely to be damaged or break off during manufacture, reducing the amount of dust, such as carbon dust, generated during manufacture.

The longitudinal grooves 210 have a depth, as indicated by dimension D2 in FIGS. 2A and 2B, that is defined by the difference between the radius of the outer surface 202 of the combustible heat source, as indicated by dimension R1 in FIG. 2B, and the radius of the bottom 212 of each groove 210, as indicated by dimension R2 in FIG. 2B. In this example, the depth of the grooves 210 is less than about 10 percent of the outer diameter, D1, of the combustible heat source 200. This has the advantage that the mass of the heat source 200, and consequently its heating performance, is substantially unaffected by the presence of the longitudinal grooves 210. Additionally, the time required for any glue filling the longitudinal grooves 210 to dry after its application may be reduced, improving manufacturability. In certain examples, the depth of the longitudinal grooves 210 is between 0.05 mm and about 0.4 mm.

In this example, the depth of each of the longitudinal grooves 210 is substantially constant along its length. In other examples (not shown) the depth of one or more grooves decreases towards its downstream end. This has the advantage that the retention of the heat source can be further improved as the glue may act as a wedge to resist upstream movement of the heat source relative to the wrapper. It has also been found to result in improved filling of the grooves 210 by the glue, since the glue more easily flows across the bottom surface 212 of each groove 210.

Figure 3A:
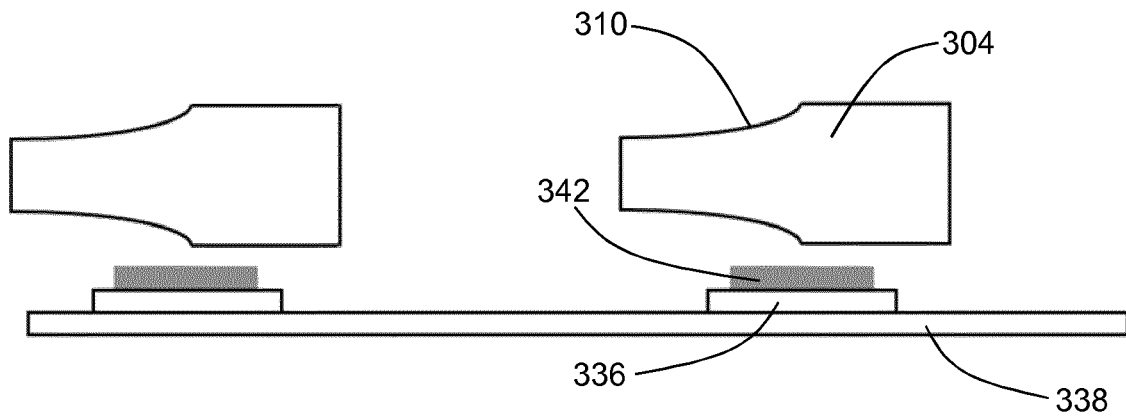
FIGS. 3A and 3B are schematic illustrations of a manufacturing process for making the multi-segment component of FIG. 1.
Figure 3B:
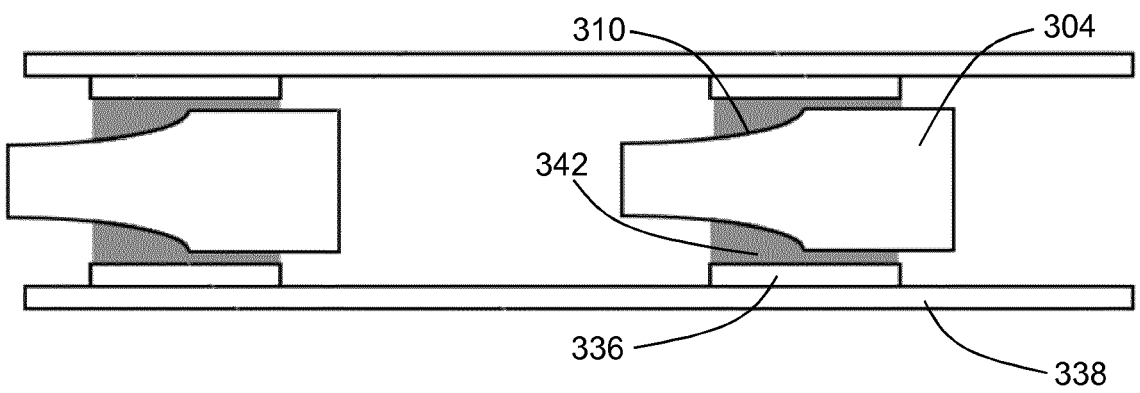

FIGS. 3A and 3B are schematic illustrations of a manufacturing process for making the multi-segment component of FIG. 1. In FIGS. 3A and 3B, the aerosol-forming substrate 10 and transfer element 12 are omitted for clarity.

In the manufacturing process, a heat-conducting sheet 336 formed from a combustion-resistant heat-conductive material, such as aluminium, is placed onto a web 338 of wrapper material, such as cigarette paper. An intumescent inorganic glue 342 is then deposited onto the heat-conducting sheet 336 using a roller and a combustible heat source 304 placed on top. Suitable intumescent inorganic glues include sodium silicate glues, such as the "Crystal" range of sodium silicate liquid glues available from PQ Corporation of Malvern, Pa., US.

As shown in FIG. 3B, the paper web 338 is then pressed against and wrapped into a cylindrical shape around the combustible heat source 304 to form a continuous tube. During this wrapping step, the intumescent inorganic glue 342 is spread over the outer surface of the combustible heat source 304 to form an intumescent layer. The intumescent inorganic glue 342 is also forced into the longitudinal grooves 310 on the outer surface of the combustible heat source 304 and to structurally bind the combustible heat source 304 to the intumescent layer. The continuous tube formed by the web 338 is then cut adjacent to the front end of each combustible heat source 304 to form individual rod-shaped multi-segment components.

Other methods are possible. For example, other techniques may be used to apply the glue to the wrapper for example spreading or spraying, using a glue gun, or rotogravure or other printing technics. The glue may be applied to the combustible heat source. The glue may be applied to the wrapper and the combustible heat source.

EXAMPLE 1

To form the intumescent layer, an inorganic sodium silicate glue having a silicon dioxide content of 28.5% to 30.0%, a sodium oxide content of 8.5% to 9.0%, and a molar ratio of 3.3 to 3.5 is applied between the combustible heat source and the wrapper using the method described above in relation to FIGS. 3A and 3B.

EXAMPLE 2

To form the intumescent layer, an inorganic sodium silicate glue having a silicon dioxide content of about 29.9%, a sodium oxide content of about 9.4%, and a molar ratio of about 3.3 is applied between the combustible heat source and the wrapper using the method described above in relation to FIGS. 3A and 3B.

EXAMPLE 3

To form the intumescent layer, an inorganic sodium silicate glue having a silicon dioxide content of 33.1% to 34.1%, a sodium oxide content of 12.0% to 13.0%, a molar ratio of 2.6 to 2.9 and a dry solids content of 45.1% to 47.1% is applied between the combustible heat source and the wrapper using the method described above in relation to FIGS. 3A and 3B.

EXAMPLE 4

To form the intumescent layer, an inorganic sodium silicate glue having a silicon dioxide content of 29.0% to 30.5%, a sodium oxide content of 8.5% to 9.0%, and a molar ratio of 2.0 to 2.1 is applied between the combustible heat source and the wrapper using the method described above in relation to FIGS. 3A and 3B.

EXAMPLE 5

To form the intumescent layer, an inorganic sodium silicate glue having a silicon dioxide content of 30% to 31%, a sodium oxide content of 11.4% to 12.4%, and a molar ratio of 2.6 to 2.7 is applied between the combustible heat source and the wrapper using the method described above in relation to FIGS. 3A and 3B.

The specific embodiments and examples described above illustrate but do not limit the invention. It is to be understood that other embodiments of the invention may be made and the specific embodiments and examples described herein are not exhaustive.

The invention claimed is:

1. A multi-segment component for an aerosol generating article, the multi-segment component comprising:
   a combustible heat source;
   an aerosol-forming substrate downstream of the combustible heat source;
   a wrapper circumscribing the combustible heat source along at least part of a length of the combustible heat source; and
   an intumescent layer between the combustible heat source and the wrapper and extending around an entire circumference of the combustible heat source, the intumescent layer being formed from an intumescent inorganic glue,
   wherein the combustible heat source has at least one shaped recess on an outer surface thereof,
   wherein the intumescent inorganic glue of the intumescent layer at least partially fills the at least one shaped recess, and
   wherein a depth of the at least one shaped recess is between about 0.05 mm and about 0.8 mm.

2. The multi-segment component according to claim 1, wherein the intumescent inorganic glue has an expansion ratio of at least about 1.5:1 when heated from 20 degrees Celsius to 700 degrees Celsius at ambient pressure.

3. The multi-segment component according to claim 1, wherein the intumescent inorganic glue has an expansion ratio of from about 2:1 to about 5:1 when heated from 20 degrees Celsius to 700 degrees Celsius at ambient pressure.

4. The multi-segment component according to claim 1, wherein the intumescent inorganic glue has an expansion ratio of about 3:1 when heated from 20 degrees Celsius to 700 degrees Celsius at ambient pressure.

5. The multi-segment component according to claim 1, wherein the intumescent layer has a thickness of at least about 0.01 mm to about 0.1 mm.

6. The multi-segment component according to claim 1, wherein the intumescent layer has a thickness of from about 0.01 mm to about 0.04 mm.

7. The multi-segment component according to claim 1, wherein the intumescent layer has a thickness of about 0.02 mm.

8. The multi-segment component according to claim wherein the intumescent inorganic glue is a foaming intumescent inorganic glue.

9. The multi-segment component according to claim 1, wherein the intumescent inorganic glue comprises at least 1% by weight of water.

10. The multi-segment component according to claim 1, wherein the intumescent inorganic glue comprises between about 1% and about 7% by weight of water.

11. The multi-segment component according to claim 1, wherein the intumescent inorganic glue comprises from about 1% to about 5% by weight of water.

12. The multi-segment component according to claim 1, wherein the intumescent layer is formed from a sodium silicate glue.

13. The multi-segment component according to claim 12, wherein the sodium silicate glue has a molar ratio of from about 2 to about 3.5 parts $SiO_2$ to 1 part $Na_2O$.

14. The multi-segment component according to claim 1, wherein the combustible heat source comprises a rear portion having a substantially constant cross-section, the at least one shaped recess terminating at an upstream end of the rear portion.

15. The multi-segment component according to claim 14, wherein the rear portion has a length of less than about 3 mm.

16. The multi-segment component according to claim 14, wherein the rear portion has a length of about 2 mm to about 3 mm.

17. The multi-segment component according to claim 1, wherein radially outer edges of the at least one shaped recess are curved with a radius of curvature of at least about 0.05 mm.

18. The multi-segment component according to claim 1, wherein an outer diameter of the combustible heat source is substantially constant along substantially an entire length of the combustible heat source.

19. The multi-segment component according to claim 1, wherein the wrapper comprises one or more layers of heat-conductive material.

20. The multi-segment component according to claim 1, wherein the wrapper comprises one or more layers of heat-insulative material.

21. The multi-segment component according to claim 1, wherein the wrapper comprises a radially inner layer of heat-conductive material and a radially outer layer of heat-insulative material.

22. An aerosol generating article comprising the multi-segment component according to claim 1.

* * * * *